Dec. 20, 1932.  A. PROCTOR  1,891,577
COLLAPSIBLE TRIPOD FOR USE IN HARVESTING CROPS
Filed Aug. 6, 1930
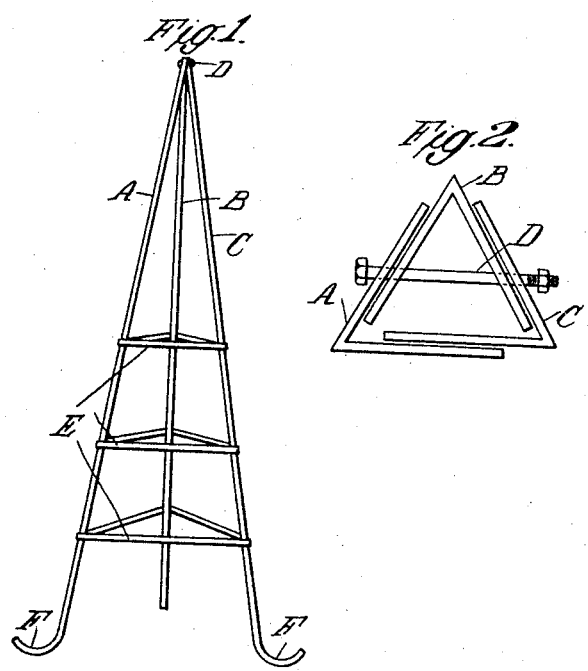
Inventor:
Alexander Proctor,
By [signature]
Attys.

Patented Dec. 20, 1932

1,891,577

UNITED STATES PATENT OFFICE

ALEXANDER PROCTOR, OF BLAIRGOWRIE, SCOTLAND

COLLAPSIBLE TRIPOD FOR USE IN HARVESTING CROPS

Application filed August 6, 1930, Serial No. 473,502, and in Great Britain August 9, 1929.

This invention relates to collapsible tripods for use in harvesting crops free of weather damage, the said tripods being of the kind comprising three metal legs of angle iron or the like adjustably secured together, for instance by a bolt of such length as to permit of their being opened out into a pyramidal arrangement, the said legs being adapted to lie in parallel order when collapsed for storage or transport.

According to the invention the legs are made of metal bent to an acute angle, say of 60°, so that each leg is preferably in the form in cross section of two sides of an equilateral triangle, and the three legs are fastened together at the top in such manner that when collapsed they constitute a triangular shaped box. The fastening bolt may pass through two sides of one leg and through one side of each of the second and third legs, so that when the tripod is closed the first leg is only exposed at the angle. The lower end of each leg is flattened out and upturned to form a curved foot, preferably of an arc of somewhat less than half a circle, to prevent the tripod from sinking or burrowing into the ground owing to the weight of crop upon it, and enabling the hay, grain, or flax ricks with tripods inside to be dragged or slid along the ground on to the hay rick lifter or bogey (as in use in Scotland and Ireland) with little tearing up of the ground or damage to the platform body of the rick lifter, which ensures expeditious, labour-saving, and easy removal of the crop from the fields.

A tripod of this shape is suitable for use with detachable triangular hoops of different sizes, which fit snugly at different heights on the angles of the tripod when erected, and is also suitable for use with crossbars or stays hinged to the legs, for example in such manner that each crossbar is adapted to fold upward in the middle and lie within the legs of the tripod when collapsed.

In order that the said invention may be clearly understood and readily carried into effect, the same will now be described more fully with reference to the accompanying drawing in which:—

Figure 1 is a perspective view of a tripod with removable hoops.

Figure 2 is a plan of the top of the tripod when collapsed.

A, B and C indicate the three legs of the tripod, D the bolt connecting them together, E removable triangular hoops. Each leg of the tripod has a curved foot as illustrated. The legs A, B, and C of the tripod being formed of angle irons and loosely fastened at D, may quickly and conveniently be collapsed for storage or transportation as shown in Figure 2. When in a collapsed state the tripod presents a very compact and easily handled structure, and one which may again be set up with ease.

What I claim and desire to secure by Letters Patent of the United States is:—

1. In a tripod for supporting agricultural crops, three legs loosely bolted together at their upper extremities to expand to any desired extent when erected, each of said legs in transverse section forming an angle of 60 degrees to support at the desired height a metal hoop of the form of an equilateral triangle.

2. The combination with a tripod as in claim 1 of a plurality of triangular metal hoops of different sizes adapted to be firmly supported at different heights on said tripod.

ALEXANDER PROCTOR.